Patented Oct. 9, 1928.

1,686,786

UNITED STATES PATENT OFFICE.

ISAIAH N. ZELLER, OF BROOKLYN, NEW YORK.

FOOD PRODUCT AND PROCESS OF MAKING SAME.

No Drawing.   Application filed December 11, 1925. Serial No. 74,893.

In a co-pending application Serial No. 291,103 filed April 18, 1919, I disclosed and claimed a food product in the nature of a dried fruit which has been reduced to flakes and which flakes were then compactly pressed together. The subject matter of the present application is also a food product which is made from dried fruits as a raw material and converted, by the steps of the process which I shall describe, into an attractive confection or article of diet. The value of dried fruit is recognized by dietitians, but the form which commercial dried fruit takes is unattractive. The primary object of my invention therefore is to transform the commercial dried fruit into a form which shall be more palatable and which shall therefore have a more ready sale and at the same time shall be beneficial to the buying public.

More specifically my invention relates to the novel and improved food product made in the form and by the process which I shall describe, and which will become evident as the specification is read. My invention may be made by several different processes. According to all of the processes I employ the commercial article known as dried fruit as a raw material. In one process I mix various dried fruits in any proportion desired and then compress the mixture until it becomes a solid mass. The mixture may be made of any dryness desired by a proper selection of the fruits which are incorporated therein. After the mixture has been rated therein. After the mixture has been thus compressed, it may be sliced into slabs or sheets of any desired thickness which may then be cut into smaller pieces of the size which it is desired to vend.

According to another process I may form a mixture in the same way as described above and then press the mixture directly into slabs which may then be cut to the desired shape and size for vending.

According to another process I may form a layer of dried fruit, all of one kind and upon this layer is spread a second layer of a different kind of dried fruit. The number of layers may be increased at will until the desired number has been reached. Then the entire series of layers is pressed so as to form one integral mass which then may be treated as described above being cut into small pieces.

Again each layer may be first compressed separately into a sheet and then the compressed layers may be laid one on top of the other and again compressed to form an integral mass, which may then be cut into small pieces as desired.

Still again in the last two described processes each layer may be coated with a saccharin solution, such as chocolate and then the layers are pressed together to form a solid slab, which may be cut into the smaller pieces of the shape and size desired.

In any of the above processes after the pieces have been finally cut to the desired size and shape, they may be coated as with a chocolate coating which will close the pores of the fruit, these pores having been opened by the compressing and cutting of the various fruits.

From the above it will be apparent that I have devised a novel and improved food product together with a process of making the same which will transform the ordinary unpalatable dried fruits into attractive form resembling confection and which will be much more palatable and salable.

I am aware that changes in the form, construction and arrangement of parts may be made without departing from the spirit and without sacrificing the advantages of the invention and I consider myself entitled to make all such changes as fairly fall within the scope of the following claims.

I claim:

1. A food product consisting of a solid compressed mass of different kinds of dried fruit.

2. A solid compressed food product consisting of a plurality of superimposed layers of different kinds of dried fruit.

3. A food product consisting of a solid compressed mass of a plurality of superimposed layers, each layer consisting of a solid compressed mass of a mixture of different kinds of dried fruit.

4. A food product consisting of a solid compressed mass of different kinds of dried fruit and having an edible coating.

5. A food product consisting of a solid compressed mass of a plurality of superimposed layers of dried fruit, each layer having an edible coating.

6. A food product consisting of a solid compressed mass of a plurality of superimposed layers of dried fruit, each layer having an edible coating, and adjacent layers consisting of different kinds of dried fruit.

ISAIAH N. ZELLER.